(12) United States Patent
Verdier et al.

(10) Patent No.: US 10,519,919 B2
(45) Date of Patent: Dec. 31, 2019

(54) METHOD TO ASSIST WITH THE STARTING OF A MOTOR VEHICLE COMBUSTION ENGINE

(71) Applicants: CONTINENTAL AUTOMOTIVE FRANCE, Toulouse (FR); CONTINENTAL AUTOMOTIVE GMBH, Hannover (DE)

(72) Inventors: Damien Verdier, Toulouse (FR); Paul Boucharel, Toulouse (FR); Jerome Lachaize, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 162 days.

(21) Appl. No.: 15/510,004

(22) PCT Filed: Aug. 21, 2015

(86) PCT No.: PCT/EP2015/001721
§ 371 (c)(1),
(2) Date: Mar. 9, 2017

(87) PCT Pub. No.: WO2016/037685
PCT Pub. Date: Mar. 17, 2016

(65) Prior Publication Data
US 2017/0260955 A1    Sep. 14, 2017

(30) Foreign Application Priority Data
Sep. 10, 2014    (FR) ...................................... 14 58464

(51) Int. Cl.
*F02N 11/08*    (2006.01)

(52) U.S. Cl.
CPC .. *F02N 11/0866* (2013.01); *F02N 2011/0888* (2013.01)

(58) Field of Classification Search
CPC ......... F02N 11/0866; F02N 2011/0888; B60L 1/00; B60L 11/1868; H02J 7/34; Y02T 10/7016; Y02T 10/7066
(Continued)

(56) References Cited

U.S. PATENT DOCUMENTS

| 2002/0145430 | A1* | 10/2002 | Arai | .................. | B60K 6/22 |
| | | | | | 324/426 |
| 2004/0008031 | A1* | 1/2004 | Arai | .................. | H01M 10/48 |
| | | | | | 324/429 |

(Continued)

FOREIGN PATENT DOCUMENTS

| CN | 101161498 | 4/2008 |
| CN | 101373901 | 2/2009 |

(Continued)

OTHER PUBLICATIONS

International Search Report, dated Sep. 29, 2015, from corresponding PCT application.

*Primary Examiner* — Krishnan Ramesh
(74) *Attorney, Agent, or Firm* — Young & Thompson

(57) ABSTRACT

A method for assistance in starting a heat engine of a motor vehicle including an auxiliary network supplied by a low-voltage auxiliary battery and by a voltage-controlled DC current source. This method is launched in the first place when the electronic control system of the vehicle is woken up as a result of a specific action performed by a user, which may be followed by an action of starting the heat engine. This method also consists in controlling the current source so as to cause it to operate at its maximum power during a time interval adapted to reach a maximum positive polarization of the auxiliary battery, and then, at the end of this (Continued)

time interval, in the absence of an effective starting command, controlling the current source so as to cancel the current flowing in the auxiliary battery.

20 Claims, 2 Drawing Sheets

(58) Field of Classification Search
USPC .......................................................... 701/22
See application file for complete search history.

(56) References Cited

U.S. PATENT DOCUMENTS

| | | | |
|---|---|---|---|
| 2008/0087479 A1 | 4/2008 | Kang | |
| 2008/0094034 A1* | 4/2008 | Takahashi | H01M 10/44 320/134 |
| 2009/0051223 A1 | 2/2009 | Woo | |
| 2012/0072063 A1 | 3/2012 | Kato et al. | |
| 2012/0268068 A1 | 10/2012 | Jung et al. | |

FOREIGN PATENT DOCUMENTS

| | | |
|---|---|---|
| CN | 102427981 | 4/2012 |
| CN | 102782930 | 11/2012 |
| DE | 10 2012 201 401 A1 | 8/2013 |
| EP | 2 610 102 A2 | 7/2013 |
| JP | 2013 149471 A | 8/2013 |
| JP | 2013 251994 A | 12/2013 |
| WO | 2013/014356 A2 | 1/2013 |
| WO | 2013/061132 A2 | 5/2013 |

* cited by examiner

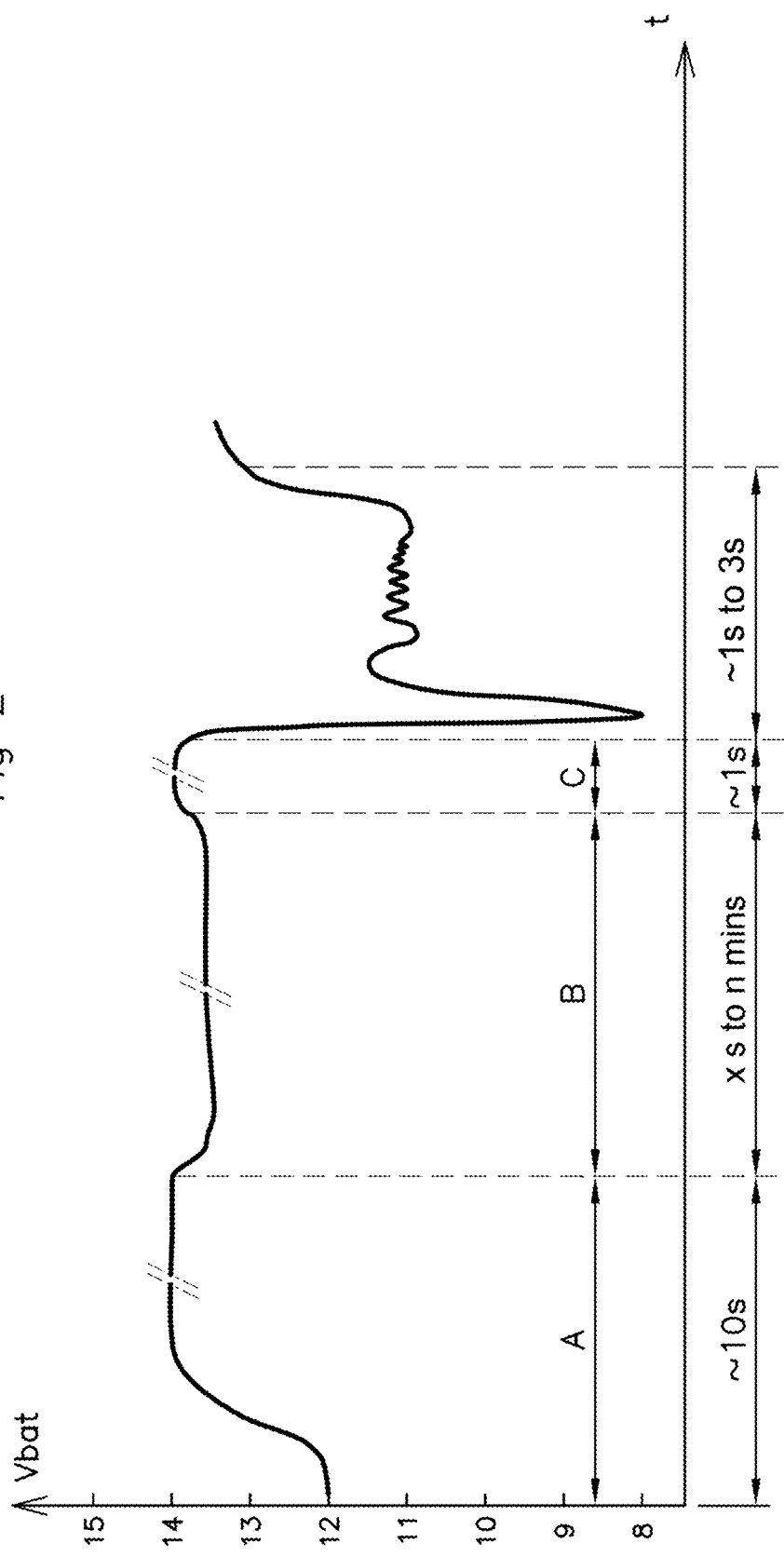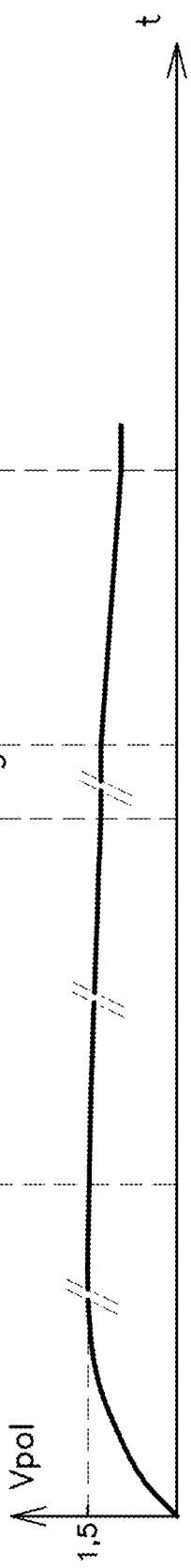

METHOD TO ASSIST WITH THE STARTING OF A MOTOR VEHICLE COMBUSTION ENGINE

BRIEF SUMMARY OF THE INVENTION

The invention relates to a method for assistance in starting a heat engine of a motor vehicle comprising an auxiliary network supplied by a low-voltage auxiliary battery, such as a lead-acid battery, and by a voltage-controlled DC current source, such as a DC/DC voltage converter.

As a general rule, the performance and convenience of the initial starting of motor vehicles, which is carried out while the heat engine and vehicle are stationary, are dependent solely on the state of the auxiliary battery supplying the starter, as a result of which this performance and adjustment is rarely optimal, notably in the case of low temperatures.

The present invention is intended to overcome this drawback for motor vehicles, notably of the hybrid or electric type, which have two power supply sources for the auxiliary network, and aims to provide a method for assistance in starting such motor vehicles, to improve and make uniform the performance and convenience of their initial starting.

Another aim of the invention is to limit the risks of voltage collapse in the auxiliary batteries of motor vehicles of this type when they are subjected to very low temperature conditions.

To this end, the invention proposes a method for assistance in starting a heat engine of a motor vehicle comprising an auxiliary network supplied by a low-voltage auxiliary battery such as a lead-acid battery and by a DC current source, such as a DC/DC voltage converter, which is voltage-controlled to supply an output voltage which is a function of the setpoint voltages, delivered by an electronic control system, for controlling said current source. According to the invention, this method is characterized in that:
  it is launched for the purpose of the initial starting of the vehicle, with the heat engine and vehicle stationary, when the electronic control system is woken up as a result of a specific action performed by a user, which may be followed by an action of starting the heat engine.
  it comprises the following steps, subsequent to its launch:
    A) controlling the current source by transmitting a setpoint voltage adapted to cause said current source to operate at its maximum power during a time interval adapted to achieve maximum positive polarization of the auxiliary battery,
    B) at the end of this time interval, in the absence of an effective starting command and while said command is being awaited, controlling the current source by transmitting setpoint values adapted to cancel the current flowing in the auxiliary battery.

The method according to the invention is therefore, in the first place, launched during a specific action performed by a user causing the electronic control system of the vehicle to wake up, such an action being, advantageously, an action of unlocking one of the doors of the motor vehicle.

When the electronic control system of the vehicle is woken up, that is to say in advance of the starting command, the starting assistance procedure used according to the invention consists in controlling the DC current source so that:
  in the first place, the polarization voltage of the auxiliary battery is increased until an optimal gain of said polarization voltage is obtained (phase A),
  and the level of polarization achieved is then maintained while awaiting a starting command (phase B).

In practice, this method causes an increase in the voltage seen by the starter when the latter is activated, and consequently improves starting performance and convenience.

Furthermore, since the voltage of the auxiliary battery is increased when this method according to the invention is used, the risks of a collapse of this voltage in very low temperature conditions are remarkably limited.

According to an advantageous embodiment of the invention, when the current source is operating at its maximum power, the setpoint voltage is limited to a value which is a function of the characteristics of the auxiliary battery, adapted to limit the effects of the ageing of said auxiliary battery.

Thus, notably, if the low-voltage auxiliary battery is a lead-acid battery, the value of the setpoint voltage is advantageously at least substantially within the range from 14.5 V to 15 V.

Additionally, for the purpose of evaluating the variation of the positive polarization of the auxiliary battery in step A) of the operation of the current source at its maximum power, this variation is advantageously calculated on the basis of measurements of the strength of the current flowing in said auxiliary battery, and of the voltage at the terminals of the auxiliary network, in order to interrupt the operation of the current source at its maximum power when the maximum value of positive polarization of said auxiliary battery is obtained.

The time taken to obtain maximum positive polarization may also be estimated on the basis of the intrinsic characteristics of the type of auxiliary battery used, and notably, if this auxiliary battery is a lead-acid battery, the current source is made to operate at its maximum power in step A) during a time interval substantially within the range from 10 s and 15 s.

According to another advantageous embodiment of the invention, which is intended to limit the drop in voltage gain in step B) when a starting command is awaited, the variation of the positive polarization value of the auxiliary battery is calculated on the basis of measurements of the strength of the current flowing in said auxiliary battery, and of the voltage at the terminals of the auxiliary network, and the current source is made to resume operation at its maximum power when this positive polarization falls below a predetermined threshold value, corresponding for example to a reduction of about 20% in the gain obtained in step A).

Additionally, according to another advantageous embodiment of the invention, in step B) the current source is made to resume operation at its maximum power when a starting command is detected. This is because this reactivation during the starting phase causes a limitation of the fall in voltage of the auxiliary battery during the operation of the starter.

BRIEF DESCRIPTION OF THE SEVERAL VIEWS OF THE DRAWINGS

Other characteristics, objects and advantages of the invention will be apparent from the following detailed description which refers to the attached drawings, which represent a preferred embodiment of the invention by way of non-limiting example. In these drawings:

FIG. 2 is a curve representing the variation with time of the voltage at the terminals of an auxiliary battery having a nominal voltage substantially equal to 12 V, during the execution of the method according to the invention, and FIG. 3 is a curve representing the variation with time of the polarization voltage of this auxiliary battery during the execution of the method according to the invention.

DETAILED DESCRIPTION OF THE INVENTION

Figure 1:
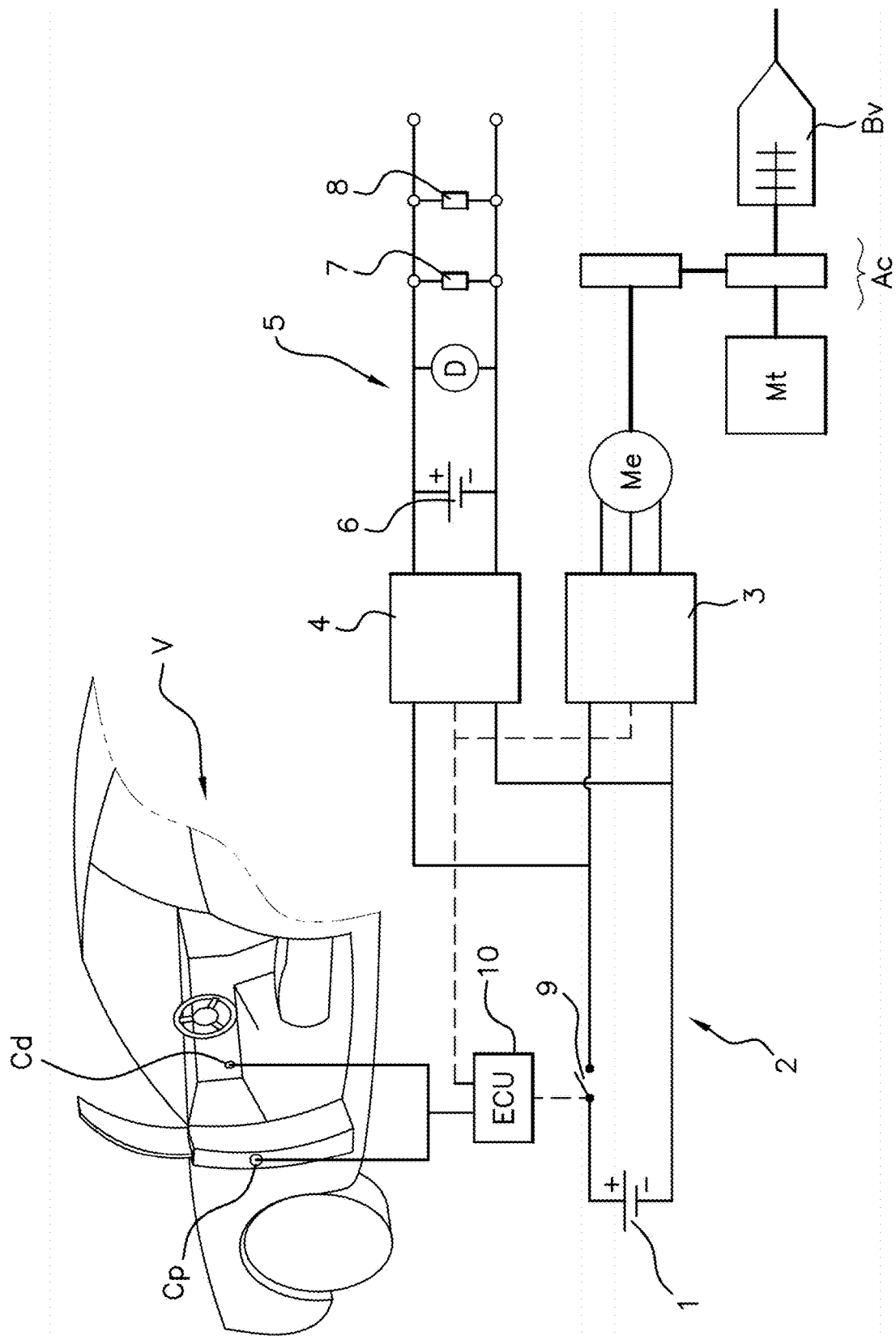
FIG. 1 is a diagram representing a hybrid or electric motor vehicle and the power supply circuit of this vehicle.

The power supply circuit for an electric or hybrid motor vehicle V shown in FIG. 1 comprises a first DC voltage source 1, integrated into a primary circuit 2, comprising:
- a DC/AC converter 3, for supplying an electric traction motor Me coupled to a heat engine Mt by a coupling system Ac for transmitting the driving torque to a gearbox By,
- and a switch 9 for opening and closing said primary circuit, the changes of state of which are controlled by an electronic control system 10, for example an electronic control unit ECU.

The power supply circuit also comprises a secondary circuit 5 forming the auxiliary network of the vehicle V, supplied by a second DC voltage source 6, and comprising a starter D, sensitive loads such as 7 and insensitive loads such as 8, connected in parallel between the terminals of said voltage source.

Usually, the first voltage source 1, in a hybrid vehicle, consists of a battery or a set of batteries, for example a lithium-ion or Ni-MH battery, delivering a nominal voltage of 48 V, and the second voltage source 6 consists of a lead-acid battery delivering a nominal voltage substantially equal to 12 V.

The primary circuit 2 and the secondary circuit 5 are also connected via a DC/DC voltage converter 4 supplied by the first DC voltage source 1 and connected in parallel with the secondary circuit 5. This voltage converter 4 is also voltage-controlled to supply an output voltage which is a function of setpoint voltages obtained from the electronic control system 10.

As shown schematically in FIG. 1, for the purpose, notably, of executing the method according to the invention for assisting in the initial starting of the heat engine Mt, this electronic control system 10 is also connected so as to receive signals obtained from:
- at least one contact Cp integrated into a door of the vehicle V and adapted to change its state when this door is unlocked,
- and a member Cd for commanding the starting of the heat engine Mt.

According to the invention, in the first place, the procedure of assistance in starting the heat engine Mt is launched when the electronic control system 10 is woken up as a result of a specific action performed by a user, representing access to the vehicle V, this action consisting, in the illustrated example, in the unlocking of one of the doors, causing the contact Cp to change its state.

When the signal representing a change of state of a contact Cp is received, the electronic control system 10 is programmed, according to the invention, for:
- causing the switch 9 of the primary circuit 2 to close so as to supply power to the voltage converter 4,
- in the first place, controlling this voltage converter 4 to cause it to operate at its maximum power during a time interval adapted to achieve maximum positive polarization of the auxiliary battery 6 (phase A of the method according to the invention shown in FIG. 2).

Furthermore, in order to make the voltage converter 4 operate at its maximum power, the setpoint voltage addressed by the electronic control system 10 is advantageously limited to a value which is a function of the characteristics of the auxiliary battery 6, and which is adapted to minimize the effects of the ageing of said auxiliary battery. For an auxiliary battery of the lead-acid battery type, having a nominal voltage substantially equal to 12 V, the setpoint voltage is thus advantageously selected within the range from 14.5 V to 15 V.

In this phase A of the operation of the voltage converter 4 at its maximum power, the variation of the positive polarization value of the auxiliary battery 6 is calculated on the basis of measurements of the strength of the current Ibat flowing in said auxiliary battery, and of the voltage Vbat at the terminals of the auxiliary network 5.

These measurements can be used, in the first place, for the calculation, with digital filtering, of the values of the polarization voltage Vpol of the auxiliary battery 6:

Vpol=(Vbat−Rs×Ibat−Voc), where Rs and Voc are, respectively, the internal resistance and no-load voltage of the auxiliary battery 6.

Since the increase in the value of the polarization voltage Vpol follows an asymptotic curve during the operation of the voltage converter 4 at its maximum power, these measurements can also be used to detect the correspondence between the measured value and the maximum value of the positive polarization Vpol of said auxiliary battery 6.

According to a variant embodiment of the method according to the invention, the time taken to reach maximum positive polarization may also be estimated on the basis of the intrinsic characteristics of the type of auxiliary battery 6 used. Thus, notably, if this auxiliary battery 6 is a lead-acid battery, the voltage converter 4 is made to operate at its maximum power in step A during a time interval which is substantially within the range from 10 s and 15 s, and which is estimated to be about 10 s on the curves of FIGS. 2 and 3.

As a general rule, phase A described above terminates when, as mentioned above, the value of the positive polarization of the auxiliary battery 6 reaches its maximum value. This is because, in practice, the time taken to reach this maximum value is usually found to be shorter than the time elapsing between the moment when the action launching the wake-up of the electronic control system 10 is performed and the actual starting command.

However, if the starting command member Cd is activated during the execution of this phase A, the electronic control system 10 is programmed to keep the operation of the voltage converter 4 at its maximum power, so as to limit the fall in the voltage of the auxiliary battery 6 during the operation of the starter D.

Conversely, in the common condition in which phase A terminates when the value of the positive polarization of the auxiliary battery 6 reaches its maximum value, the electronic control system 10 is then programmed to control the voltage converter 4 by transmitting the setpoint values adapted to cancel the current flowing in the auxiliary battery 6 (phase B of the method according to the invention shown in FIG. 2):
- until a starting command from the command member Cd is detected,
- or, if there is no starting command, until the end of a predetermined time interval that may be estimated to be a plurality n of minutes at the end of which the electronic control system 10 switches to stand-by.

The purpose of this operating phase B is to maintain the level of polarization obtained in the operating phase A while awaiting a starting command.

To this end, during this phase B and while awaiting a starting command, the following actions also take place:

the variation of the positive polarization value of the auxiliary battery 6 is calculated on the basis of measurements of the strength of the current flowing in said auxiliary battery, and of the voltage at the terminals of the auxiliary network 5, and the voltage converter 4 is made to resume operation at its maximum power when this positive polarization falls below a predetermined threshold value, corresponding for example to a reduction of about 20% in the gain obtained in phase A.

In the final step of the method according to the invention, if a starting command is detected during phase B of this method, the voltage converter 4 is made to resume operation at its maximum power, so as to limit the fall in the voltage of the auxiliary battery 6 during the operation (for a time estimated to be between 1 and 3 s) of the starter D (phase C of the method according to the invention shown in FIG. 2).

The method according to the invention can therefore be used, by a simple software adaptation of the electronic control system 10 for controlling voltage converters 4 of electric or hybrid motor vehicles V, to improve and make uniform the performance and convenience of the initial starting of these vehicles.

The invention claimed is:

1. A method for assistance in starting a heat engine of a motor vehicle, the motor vehicle including an auxiliary network supplied by a low-voltage auxiliary battery and by a direct current (DC) current source, the DC current source being voltage-controlled to supply an output voltage which is a function of setpoint voltages for the control of said DC current source, delivered by an electronic control system, said method comprising:
   A) controlling the DC current source by transmitting a setpoint voltage that causes said DC current source to operate at a maximum power during a time interval to achieve maximum positive polarization of the auxiliary battery; and
   B) controlling the DC current source by transmitting setpoint values that cancel the DC current flowing in the auxiliary battery, at an end of the time interval, in response to an absence of an effective starting command,
   wherein step A) is launched to initially start the vehicle, with the heat engine and the vehicle stationary, when the electronic control system is triggered as a result of a specific action performed by a user.

2. The method for assistance in starting the heat engine of the motor vehicle as claimed in claim 1, wherein, when the DC current source is operating at the maximum power, the setpoint voltage is limited to a value which is a function of the characteristics of the auxiliary battery, the value limiting the effects of the ageing of said auxiliary battery.

3. The method for assistance in starting the heat engine of the motor vehicle as claimed in claim 2, wherein the low-voltage auxiliary battery consists of a lead-acid battery, and
   wherein, when the DC current source is operating at the maximum power, the value of the setpoint voltage is at least substantially within the range from 14.5 V to 15 V.

4. The method for assistance in starting the heat engine of the motor vehicle as claimed in claim 3, wherein, in step A), the variation of the positive polarization of the auxiliary battery is calculated based on measurements of the strength of the DC current flowing in said auxiliary battery, and of the voltage at the terminals of the auxiliary network, to interrupt the operation of the DC current source at the maximum power when the maximum value of positive polarization of said auxiliary battery is obtained.

5. The method for assistance in starting the heat engine of the motor vehicle as claimed in claim 3, wherein the low-voltage auxiliary battery consists of a lead-acid battery, and
   wherein, in step A), the current source is made to operate at the maximum power during a time interval lying substantially within the range from 10 s to 15 s.

6. The method for assistance in starting the heat engine of the motor vehicle as claimed in claim 3, wherein, in step B), while a starting command is awaited, the variation of the positive polarization of the auxiliary battery is calculated based on measurements of the strength of the DC current flowing in said auxiliary battery, and of the voltage at the terminals of the auxiliary network, and the DC current source is made to resume operation at the maximum power when the positive polarization falls below a predetermined threshold value.

7. The method for assistance in starting the heat engine of the motor vehicle as claimed in claim 3, wherein, in step B), when a starting command is detected, the DC current source is made to resume operation at the maximum power.

8. The method for assistance in starting the heat engine of the motor vehicle as claimed in claim 2, wherein, in step A), the variation of the positive polarization of the auxiliary battery is calculated based on measurements of the strength of the DC current flowing in said auxiliary battery, and of the voltage at the terminals of the auxiliary network, to interrupt the operation of the DC current source at the maximum power when the maximum value of positive polarization of said auxiliary battery is obtained.

9. The method for assistance in starting the heat engine of the motor vehicle as claimed in claim 2, wherein the low-voltage auxiliary battery consists of a lead-acid battery, and
   wherein, in step A), the current source is made to operate at the maximum power during a time interval lying substantially within the range from 10 s to 15 s.

10. The method for assistance in starting the heat engine of the motor vehicle as claimed in claim 2, wherein, in step B), while a starting command is awaited, the variation of the positive polarization of the auxiliary battery is calculated based on measurements of the strength of the DC current flowing in said auxiliary battery, and of the voltage at the terminals of the auxiliary network, and the DC current source is made to resume operation at the maximum power when the positive polarization falls below a predetermined threshold value.

11. The method for assistance in starting the heat engine of the motor vehicle as claimed in claim 2, wherein, in step B), when a starting command is detected, the DC current source is made to resume operation at the maximum power.

12. The method for assistance in starting the heat engine of the motor vehicle as claimed in claim 1, wherein, in step A), the variation of the positive polarization of the auxiliary battery is calculated based on measurements of the strength of the DC current flowing in said auxiliary battery, and of the voltage at the terminals of the auxiliary network, to interrupt the operation of the DC current source at the maximum power when the maximum value of positive polarization of said auxiliary battery is obtained.

13. The method for assistance in starting the heat engine of the motor vehicle as claimed in claim 12, wherein, in step B), while a starting command is awaited, the variation of the positive polarization of the auxiliary battery is calculated based on measurements of the strength of the DC current flowing in said auxiliary battery, and of the voltage at the terminals of the auxiliary network, and the DC current source is made to resume operation at the maximum power when the positive polarization falls below a predetermined threshold value.

14. The method for assistance in starting the heat engine of the motor vehicle as claimed in claim 12, wherein, in step B), when a starting command is detected, the DC current source is made to resume operation at the maximum power.

15. The method for assistance in starting the heat engine of the motor vehicle as claimed in claim 1, wherein the low-voltage auxiliary battery consists of a lead-acid battery, and wherein, in step A), the current source is made to operate at the maximum power during a time interval lying substantially within the range from 10 s to 15 s.

16. The method for assistance in starting the heat engine of the motor vehicle as claimed in claim 15, wherein, in step B), while a starting command is awaited, the variation of the positive polarization of the auxiliary battery is calculated based on measurements of the strength of the DC current flowing in said auxiliary battery, and of the voltage at the terminals of the auxiliary network, and the DC current source is made to resume operation at the maximum power when the positive polarization falls below a predetermined threshold value.

17. The method for assistance in starting the heat engine of the motor vehicle as claimed in claim 15, wherein, in step B), when a starting command is detected, the DC current source is made to resume operation at the maximum power.

18. The method for assistance in starting the heat engine of the motor vehicle as claimed in claim 1, wherein, in step B), while a starting command is awaited, the variation of the positive polarization of the auxiliary battery is calculated based on measurements of the strength of the DC current flowing in said auxiliary battery, and of the voltage at the terminals of the auxiliary network, and the DC current source is made to resume operation at the maximum power when the positive polarization falls below a predetermined threshold value.

19. The method for assistance in starting the heat engine of the motor vehicle as claimed in claim 1, wherein, in step B), when a starting command is detected, the DC current source is made to resume operation at the maximum power.

20. The method for assistance in starting the heat engine of the motor vehicle as claimed in claim 1, wherein the specific action performed by the user is an action of unlocking one of the doors of the motor vehicle.

* * * * *